Dec. 30, 1941.  R. I. MARKEY  2,267,935

GRIP NUT

Filed Dec. 7, 1940

INVENTOR.
Roscoe I. Markey.
BY
ATTORNEY.

Patented Dec. 30, 1941

2,267,935

UNITED STATES PATENT OFFICE 2,267,935

GRIP NUT

Roscoe I. Markey, East Orange, N. J., assignor to Pollak Manufacturing Company, Arlington, N. J., a corporation of New Jersey Application December 7, 1940, Serial No. 369,049

6 Claims. (Cl. 151—21)

The invention relates to grip nuts.

The principal object of the invention is to provide a grip nut of exceedingly simple construction presenting substantial economies in manufacturing costs and one that will not back off or become accidentally displaced due to excessive vibration. In accordance with the invention the nut is of one piece construction and embodies an elastic element which encircles a portion of the threaded circumference.

Other objects and advantages will become apparent as this specification proceeds. Referring to the drawing forming a part thereof and in which a preferred embodiment of the invention is illustrated:

Figure 1:
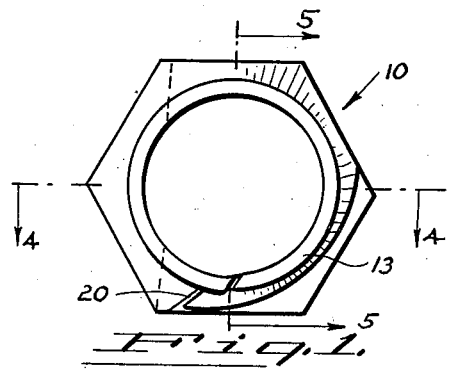
Fig. 1 is a top plan view of the improved grip nut.
Figure 4:
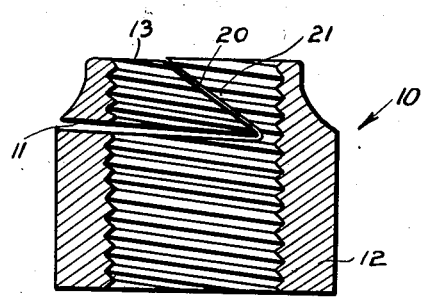
Figure 5:
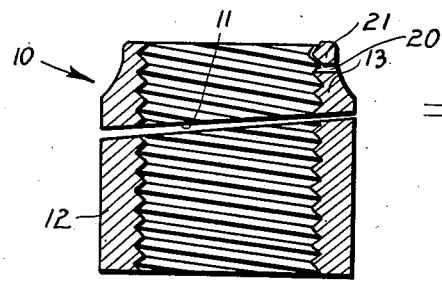
Figure 6:
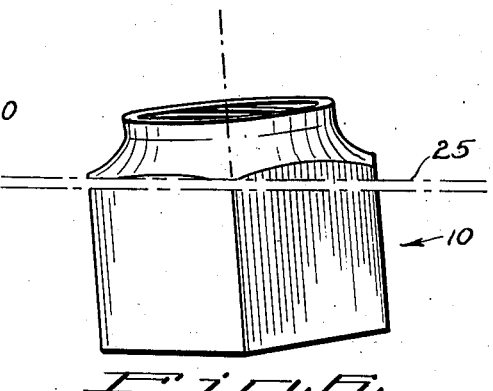

Figs. 4 and 5 are sectional views taken on the lines 4—4 and 5—5, respectively, of Fig. 1; and Fig. 6 is a perspective view of the grip nut illustrating the method of forming the main slot.

This application is a continuation in part of my United States Patent No. 2,235,405 issued March 18, 1941.

The invention is applicable to nuts of any size and any structural metal may be utilized in their construction. However, for the greatest efficiency in gripping and to prevent the nut from backing off or becoming accidentally displaced a material is preferably used having a high yield stress and low modulus of elasticity. The material should be strong and tough, having sufficient resiliency to permit of the bending and gripping action required, yet not be subject to permanent deformation when used. It has been found in practice that high grade metal used in springs forms a good grip nut, as the nut as heretofore stated embodies an elastic element which forms a part thereof.

Referring again to the drawing the nut 10 has a transverse angularly disposed slot 11 traversing a plurality of threads and extending across the nut for substantially more than one half the diameter thereof. This slot divides the nut into two portions one of which may be termed the body-portion 12 and the other an elastic element 13 which may be likened to or compared with a cantilever beam which has its base in the body-portion of the nut and is wrapped around the threaded area.

As illustrated the beam 13 is bent with increasing curvature from its base to its tip. The radius of its threaded area at its base is that of the basic nut and the radius of the threaded area at its tip is less than that of the basic nut, thus bringing the gripping beam closer to the axis of the nut and thereby gripping the bolt onto which the nut is screwed in a more efficient manner.

The cantilever beam is also preformed or crimped in an axial direction thus setting up an axial force. This distortion is accomplished by pressing the tip of the beam slightly downward and thus in effect narrowing the slot gradually from the base to the tip. The basic part of the nut resists this axial force and the radial force heretofore described and both contribute to the total gripping power of the nut.

The slot 11 is so disposed that the cantilever beam is reduced in cross section from its base to its tip thus equaling or approaching a tapered cantilever beam with constant stress throughout its length when the nut is in position on a bolt. By having or approaching constant stress throughout the length of the gripping cantilever beam a maximum total gripping force is obtained when the nut is in place.

From the foregoing it will be apparent that a nut having a cantilever beam or elastic element in which both radial and axial forces are set up to resist action of the nut backing off or becoming displaced is provided. In addition to these two sources of friction the one piece nut embodies a third which will cause a maximum gripping force to prevail. This third force is controlled by the direction of the wrap of the cantilever beam. The sliding frictional force exerted between the nut and the bolt lifts the curved beam off the bolt, thus reducing the total gripping force when the nut is turned around the bolt with the tip of the curved beam leading as would be the condition when threading the nut on a bolt. The maximum gripping force to resist rotation comes into effect when the base of the curved beam leads its tip as the benefit of direction of wrap is then obtained and the maximum frictional force is exerted between the nut and the bolt as when removing the nut from the bolt.

The invention as thus far described is similar to that illustrated and described in my United States Patent No. 2,235,405 issued March 18, 1941, heretofore referred to. In that application the slot 11 was intercepted at the free end of the beam by another slot extending downwardly and inwardly. It has been found out in practice, especially where the radial and axial crimping is somewhat excessive, there is a tendency for the elastic element to move away from the body-portion of the nut when threading the nut onto a bolt. In extreme cases the arm has even snapped off. However, it could well happen that the elastic element could become sufficiently distorted to spoil its efficiency and not be noticed when the grip nut was screwed into position.

Figure 2:
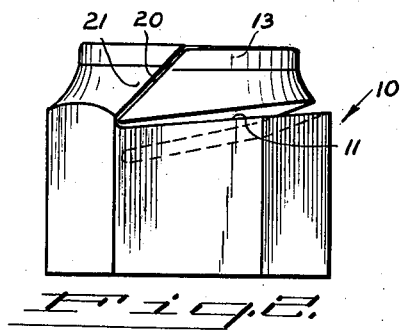
Fig. 2 is an elevational view.
Figure 3:
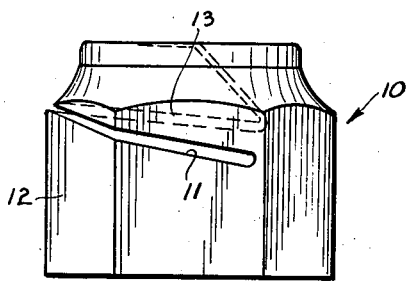
Fig. 3 is an elevation looking from the opposite side from that shown in Fig. 2.

The principal object of the present invention is to so arrange the slot 20 that the elastic element 13 cannot become materially displaced when threading the nut onto a bolt. For this reason the slot 20 is angularly disposed in relation to the slot 11 as particularly shown in Figs. 2 and 4. The body of the nut is thus provided with an undercut portion or what might be termed an axial support 21 for the gripping arm 13 when the nut is being screwed on to the bolt.

The slot 11 is made in one cut as shown in Fig. 6 where the cutter is diagrammatically illustrated by the broken lines 25. The cutter may be angularly disposed to the nut or as illustrated the nut may be angularly disposed to the cutter. In order to obtain the proper cut the cutter is angularly disposed both as to the axis of the nut and the face of the nut.

The actual amount of axial and radial preforming or crimping of the elastic element for efficient operation is very small and particularly in the smaller sized nuts is hardly discernible to the naked eye. For purpose of illustration the crimping has been exaggerated.

Changes in details of construction may be made by one skilled in the art without departing from the spirit of the invention as set forth in the appended claims.

I claim:

1. A grip nut having a slot traversing substantially more than one half of the circumference of the nut, another slot intercepting said first mentioned slot so as to form a curved cantilever beam, said second mentioned slot being angularly disposed to the first slot so as to provide an axial support for said cantilever beam, the radius of the threaded area at the base of the cantilever beam being that of the basic nut, said beam being deflected inwardly so that the radius of threaded area at the end of the cantilever beam is less than that of the basic nut so as to exert radial pressure.

2. A grip nut having a slot traversing substantially more than one half of the circumference of the nut, another slot intercepting said first mentioned slot so as to form a curved cantilever beam, said second mentioned slot being angularly disposed to the first slot so as to provide an axial support for said cantilever beam, the radius of the threaded area at the base of the cantilever beam being that of the basic nut, said beam being deflected inwardly so that the radius of threaded area at the end of the cantilever beam is less than that of the basic nut so as to exert radial pressure, the beam being distorted axially by depressing it at its end portion so as to exert axial pressure.

3. A grip nut having a slot traversing substantially more than one half of the circumference of the nut, another slot intercepting said first mentioned slot so as to form a curved cantilever beam, said second mentioned slot being angularly disposed to the first slot so as to provide an axial support for said cantilever beam, the beam being distorted axially by depressing it at its end portion so as to exert axial pressure.

4. A grip nut having a diagonally extending slot crossing a plurality of threads and traversing substantially more than one half of the circumference of the nut, another slot intercepting said first mentioned slot at its upper end so as to form a curved cantilever beam, the cross section of the beam gradually decreasing in thickness from the base of the slot to the tip or free end of the beam, said second mentioned slot being angularly disposed to the first slot so as to provide an axial support for said cantilever beam, the radius of the threaded area at the base of the cantilever beam being that of the basic nut, said beam being deflected inwardly so that the radius of the threaded area at the tip of the cantilever beam is less than that of the basic nut so as to exert radial pressure.

5. A grip nut having a diagonally extending slot crossing a plurality of threads and traversing substantially more than one half of the circumference of the nut, another slot intercepting said first mentioned slot at its upper end so as to form a curved cantilever beam, the cross section of the beam gradually decreasing in thickness from the base of the slot to the tip or free end of the beam, said second mentioned slot being angularly disposed to the first slot so as to provide an axial support for said cantilever beam, the radius of the threaded area at the base of the cantilever beam being that of the basic nut, said beam being deflected inwardly so that the radius of the threaded area at the tip of the cantilever beam is less than that of the basic nut so as to exert radial pressure, the beam being distorted axially by depressing it at its tip portion so as to exert axial pressure.

6. A grip nut having a diagonally extending slot crossing a plurality of threads and traversing substantially more than one half of the circumference of the nut, another slot intercepting said first mentioned slot at its upper end so as to form a curved cantilever beam, the cross section of the beam gradually decreasing in thickness from the base of the slot to the tip or free end of the beam, said second mentioned slot being angularly disposed so as to provide an axial support for said cantilever beam, the radius of the threaded area at the base of the cantilever beam being that of the basic nut, said beam being deflected inwardly so that the radius of the threaded area at the tip of the cantilever beam is less than that of the basic nut so as to exert radial pressure, the beam being distorted axially by depressing it at its tip portion so as to exert axial pressure, a grip nut thus being formed which in addition to radial and axial forces being set up to resist action of the nut backing off the bolt onto which it is screwed, a third force exists which is controlled by the direction of wrap of the elastic element, the sliding frictional forces exerted between the nut and the bolt lifting the curved elastic element off the bolt to reduce the total gripping force when the nut is turned around the bolt with the tip of the elastic element leading as would be the condition when threading the nut on a bolt, and the maximum gripping force to resist rotation of the nut coming into effect when the base of the elastic element leads its tip so that the benefit of direction of wrap is obtained and the maximum frictional force is exerted between the nut and the bolt when removing the nut from the bolt.

ROSCOE I. MARKEY.